July 26, 1966  L. D. SOLLENBERGER ETAL  3,262,540
SLUG DETECTOR FOR PARKING METERS
Filed Nov. 3, 1964  3 Sheets-Sheet 1

INVENTORS
Lester D. Sollenberger
and Edward C. Arzig
By McDougall, Hersh & Scott
Att'ys July 26, 1966  L. D. SOLLENBERGER ETAL  3,262,540
SLUG DETECTOR FOR PARKING METERS
Filed Nov. 3, 1964  3 Sheets-Sheet 2

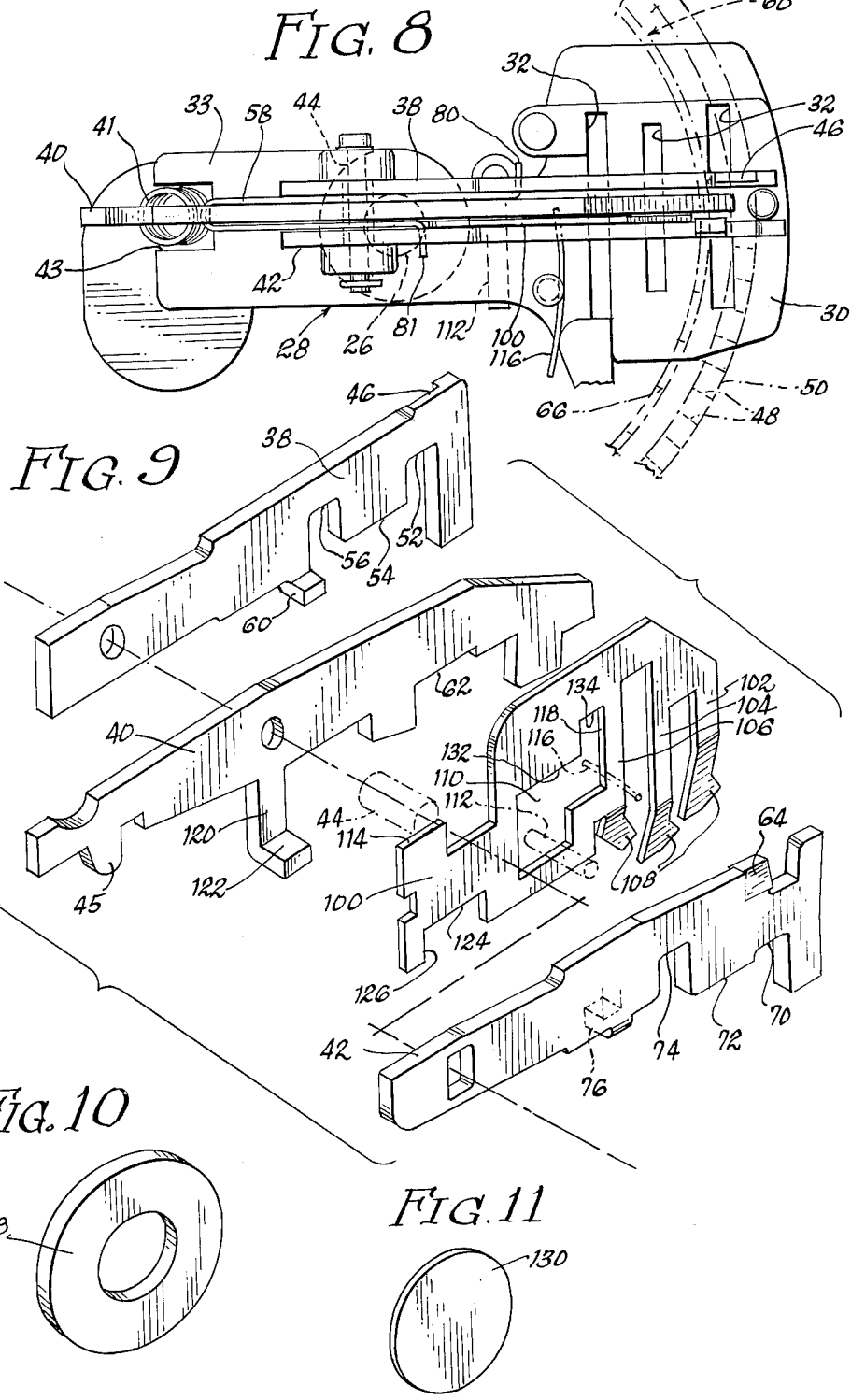

United States Patent Office 3,262,540
Patented July 26, 1966

3,262,540
SLUG DETECTOR FOR PARKING METERS
Lester D. Sollenberger, Oak Park, and Edward C. Arzig, Mundelein, Ill., assignors to Duncan Parking Meter Corporation, Chicago, Ill., a corporation of New York
Filed Nov. 3, 1964, Ser. No. 408,639
7 Claims. (Cl. 194—72)

This invention relates to an apparatus for detecting the use of slugs in coin operated machines. In particular, the invention is directed to a slug detecting device which is adapted to be employed in combination with a parking meter whereby time will not be recorded on the meter when slugs are used.

The use of slugs for cheating parking meters is a relatively common occurrence. This is partly due to the fact that the meters cannot be attended, and therefore an individual using a meter does so in virtual privacy. Even though some meters indicate by means of windows or other devices the coin just inserted, there is no effective way to police the meters and to apprehend violators. In meters where the coins, along with slugs, are deposited in a coin box after insertion, it would be practically impossible to determine if a particular individual had used a slug, even if policing were possible.

There are slug detecting devices employed in vending machines and other large coin operated constructions. These devices are extremely effective for detecting slugs. However, in virtually all cases, the detecting means are relatively bulky, and are therefore not adaptable to parking meters. It is an important consideration, from the standpoint of cost and appearance, that meters be kept as small as possible, and the use of standard detecting devices would materially increase both the cost and size of conventional meters.

It is an object of this invention to provide a novel slug detecting means which is quite small and simple to operate, whereby the means can be used without an undue increase in cost, and without unduly increasing the size of the constructions with which it is associated.

It is a further object of this invention to provide a slug detecting device which is particularly adaptable for association with parking meters.

It is a still further object of this invention to provide a slug detector for parking meters which can be associated with the meters without requiring any significant changes in the conventional meter operation, and whereby the detecting device can be associated with the meter without a significant increase in cost, assembly operations, or maintenance charges.

These and other objects of this invention will appear hereinafter and, for purposes of illustration but not of limitation, specific embodiments of this invention are shown in the accompanying drawings in which FIGURE 1 is an elevational view of a conventional parking meter adapted to be modified by the inclusion of the slug detector of this invention;

FIGURE 8 is a view taken about the line 8—8 of FIGURE 7;

FIGURE 9 is an exploded view illustrating the arrangement of pawl elements, and the slug detecting element employed in the meter; and FIGURES 10 and 11 illustrate the type of slugs adapted to be detected by the device of this invention.

The instant invention is generally directed to a slug detector mechanism suitable for use in various coin activated constructions. The particular constructions with which the invention is concerned are those constructions which provide at least one coin slot adapted to receive and hold an inserted coin. The following operations of the construction must be dependent upon the presence of the coin in the coin slot, and the slug detector of this invention is adapted to disrupt the following operations in the event that slugs of certain characteristics are in the coin slot instead of a proper coin.

The detecting device of this invention comprises a finger adapted to be positioned at the side of a coin slot. The finger defines a protruding end portion which extends toward the coin slot whereby the end portion is adapted to enter part way into the slot for engagement with the side wall of a coin. Means are provided for normally urging the finger means toward the slot whereby the protruding end is adapted to enter further into the slot when a slug having certain characteristics is present in the slot instead of a coin.

The operations of the coin operated mechanism can be made dependent upon the position of the finger after insertion of a coin or a slug. If a coin is present, the protruding end of the finger will engage the side of the coin to assume a particular position which permits operation of the coin operated construction in the expected manner. On the other hand, if a slug is present and the protruding end extends into the coin slot beyond a certain distance, then the normal machine operation will be altered whereby the individual using the slug will not receive the intended benefit.

The instant invention will be specifically described with reference to a parking meter. In such meters there are usually a plurality of coin slots whereby coins of different denominations can be employed. In such a case, the detecting means of this invention comprises a slidable member having a plurality of fingers corresponding to the number of coin slots. Accordingly, slug detection will occur when a slug is present in any of the coin slots.

Figure 1:
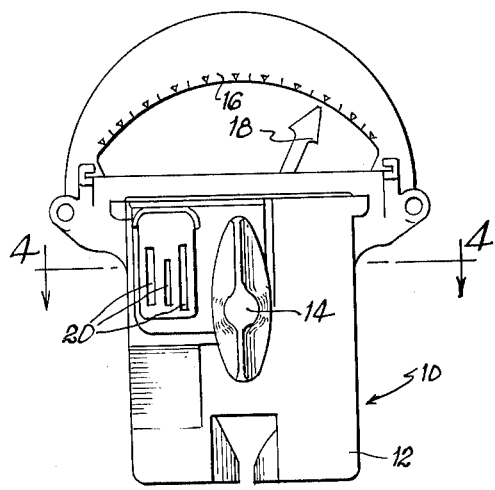
Figure 2:
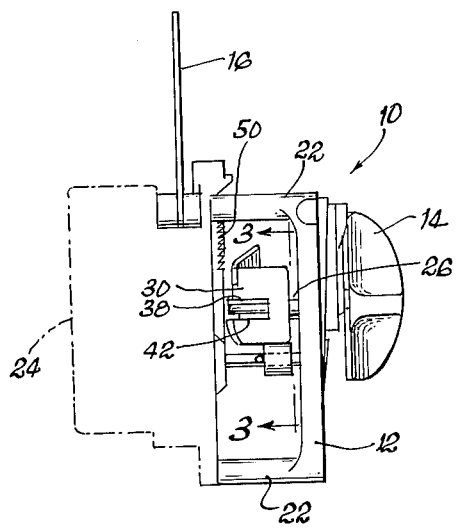
FIGURE 2 is a side elevational view of the meter of FIGURE 1 with the side casings removed.

The meter 10 shown in FIGURE 1 illustrates one type of meter which can be employed in combination with the detecting means of this invention. The meter includes a front panel 12 which carries a handle 14 adapted to be rotated for the setting of time on the meter. The time set on the meter is recorded on an indicator dial 16 by means of the pointer 18. Openings 20 are provided on the face of the meter for receiving coins of different denominations. It will be appreciated that the instant invention could apply to an apparatus employing a single coin, or any one of various combinations.

Behind the front panel 12 there are provided support posts 22 for carrying a timer mechanism 24. Intermediate the timer mechanism and the front panel, there are provided the elements which are operated by the handle 14 for setting of the time on the meter. It will be appreciated that these elements have been previously employed, with the exception of the slug detecting aspects thereof. Although a description of the operation of these elements will be provided herein in only general terms, reference can be made to United States Patents Nos. 1,799,056 and 2,070,445 for a more specific description.

Figure 3:
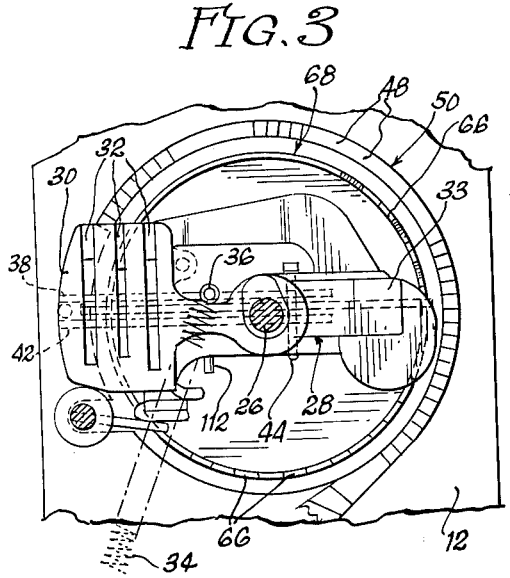
FIGURE 3 is an enlarged cross-sectional view taken about the line 3—3 of FIGURE 2.
Figure 4:
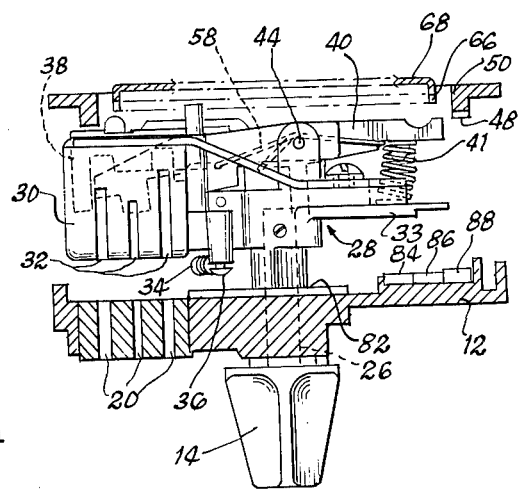
FIGURE 4 is an enlarged cross-sectional view taken about the line 4—4 of FIGURE 1.

A handle 14 is tied to a shaft 26 whereby rotation of the handle will provide for rotation of this shaft. Also tied to the shaft on the inside of the front wall is a member 28 which includes a coin carrier 30 extending in one direction from the shaft, and an arm 33 extending in the opposite direction. The coin carrier 30 defines a plurality of coin slots 32 which are aligned with the openings 20 when the shaft 26 is in its normal position. A spring 34 is secured at one end to the panel 12, while the other end is attached at 36 to the member 28 whereby the member is normally at the position shown in FIGURE 3.

A pawl member 38, element 40, and pawl member 42 are pivotally attached to the member 28 by means of a pivot pin 44. The pawl member 38 includes an end portion 46 which is provided for engagement with the teeth 48 of a stationary ratchet wheel 50. Recessed points 52, 54 or 56 defined on the inner edges of the pawl member 38 are provided so that the pawl will not interfere with coins inserted into the meter. The pawl 38 is adapted to be pivoted about the pin 44 to move the pawl member 38 from the position shown in FIGURE 7 to the position shown in FIGURE 6. It will be noted that the points 52, 54 and 56 are located at different depths with respect to the member 38. This arrangement is necessary because of the different diameters of coins inserted.

The pawl member 42 includes an engaging end 64 which is adapted to engage the teeth 66 of the timer winding wheel 68. This pawl member includes recessed points 70, 72 and 74, which correspond generally to the points 52, 54 and 56 on the pawl member 38.

Figure 5:
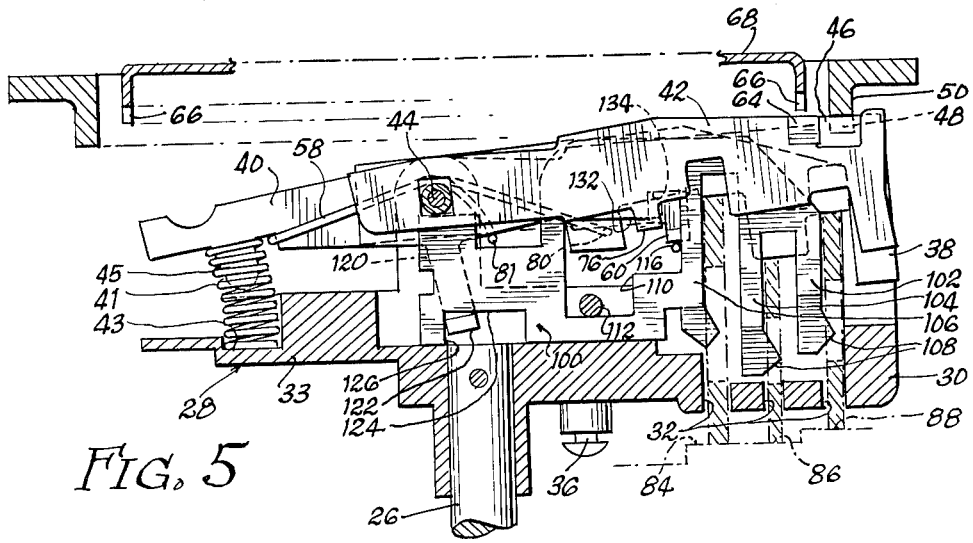
FIGURE 5 is a horizontal sectional view of the meter illustrating the timer actuating ratchets and cam members in the positions assumed when certain slugs are inserted in the meter.
Figure 6:
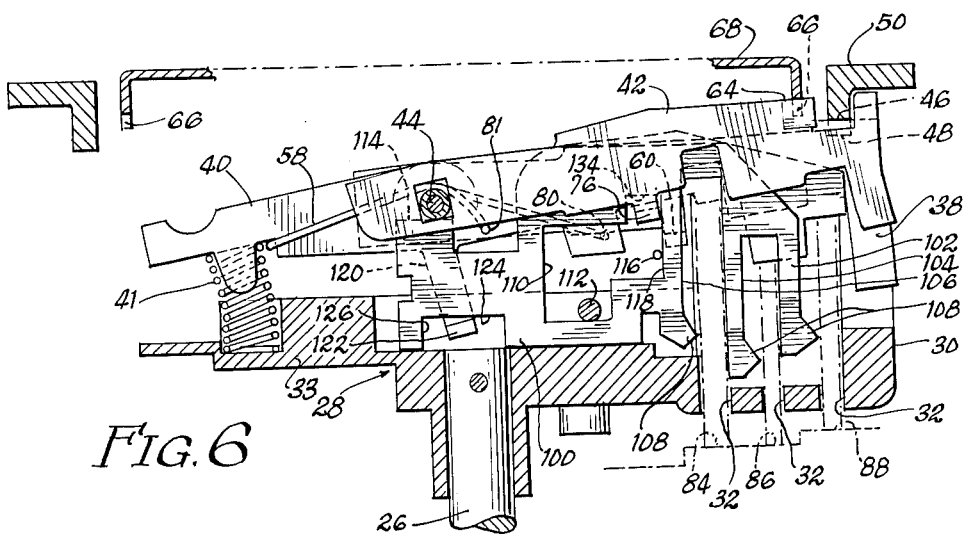
FIGURE 6 is a horizontal sectional view taken through the same plane as FIGURE 5 and illustrating the structures in the positions assumed when coins are inserted in the meter.
Figure 7:
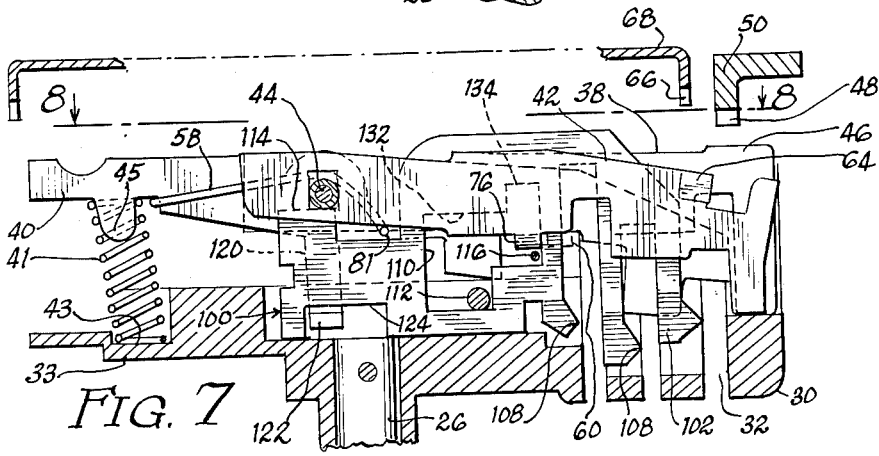
FIGURE 7 is a horizontal sectional view taken through the same plane as FIGURE 5 and illustrating the positions assumed without coins or slugs in the meter.

Element 40 functions as a means for controlling the positions of the pawl members during the meter operation. As shown in FIGURES 5, 6 and 7, a spring 58 associated with the element 40 includes spring ends 80 and 81 which engage the pawls 38 and 42, respectively. The spring normally urges the pawls upwardly relative to the element 40. A detent 60 is formed in the pawl member 38, and this detent normally engages the under side of the element 40 at 62. The pawl member 42 also includes a detent 76 which is adapted to be positioned opposite the edge portion 62 of the element 40. These detents enable the position of the pawls to be controlled by the element 40.

The element 40 is adapted to be engaged by an inserted coin, and the pawls 38 and 42 are adapted to move when the element 40 is so engaged. Specifically, the ends 80 and 81 of the spring 58 tend to force the respective detents 60 and 76 into bearing engagement with the element 40 whereby upward movement of the element will enable the pawls to follow in the upward direction. The element 40 is normally urged downwardly by a compression spring 41 which has one end located in the seat 43 defined in the arm 33, while the other end fits around protuberance 45 formed in the element 40. When a coin is inserted, the element 40 is moved upwardly in opposition to the spring 41. In the normal meter operation, a coin is inserted and the handle 14 is then rotated. During this rotation, the pawl member 38 rides over the teeth 48, and this pawl member is urged against these teeth by means of the end 80 of the spring 58 (see FIGURE 8). The teeth 48 are designed whereby they will hold the shaft against return movement due to action of the spring 34 as long as the pawl 38 is forced into engagement with these teeth.

As the rotation of the handle continues, the coin remains in the coin carrier and it rides on the inner surface 82 of the panel 12. Rises 84, 86 and 88 are formed on this inner surface in alignment with each of the coin slots. Accordingly, each coin will engage one of these rises during movement of the coin carrier, and it will be appreciated that the coins are forced further into the coin carrier due to this action. This further movement of a coin will move the element 40 a corresponding distance to permit movement of the pawl 42 whereby the pawl engaging portion 64 will engage a tooth 66 of the winding wheel 68. Continued rotation of the handle 14 will therefore result in corresponding rotation of the winding wheel. The length of the rises 84, 86 and 88 is such that the degree of rotation of the winding wheel will be proportional to the denomination of the coin inserted while the coin will drop out of the coin carrier. As previously explained, the mechanisms described, including the operation of the timer by the winding wheel, have been used before, and their general operation is disclosed in the aforementioned patents.

The instant invention particularly involves a slug detector element 100 which is located in association with the pawl members and the element 40. In the embodiment disclosed, the detector element is positioned between the element 40 and the pawl member 42.

The element 100 is a slidable member which includes fingers 102, 104 and 106. It will be appreciated that the number of these fingers will correspond with the number of coin slots in the coin carrier. Each of the fingers defines a protruding end 108 and, as shown in FIGURES 5, 6 and 7, the protruding ends are located whereby they extend toward the coin slots in the coin carrier 30.

The element 100 defines an opening 110, and this opening is adapted to receive a stationary guide pin 112. This pin is rigidly associated with the member 28, and an edge 114 defined by the element 100 engages the pin 44 about which pivotal movement is accomplished. With this arrangement, the element 100 is confined except for sliding movement in a direction toward and away from the coin slots. A spring 116 held at its end by the member 28 engages an edge 118 defined by the element 100 to normally urge the elements toward the coin slots.

The arm 120 on the element 40 and the detent portion 122 thereof cooperate to move the element 100 in opposition to the spring 116. It will be noted that a recess 124 is defined by the element 100, and the detent 122 is adapted to engage the edge 126 of this recess. When the coin is removed from the coin carrier after setting of time on the meter, the spring 41 will return the element 40 to the position of FIGURE 7, and the action of the detent 122 will carry the element 100 along with it.

FIGURES 10 and 11 illustrate the types of slugs which can be detected by the mechanism of this invention. In FIGURE 10, the slug 128 takes the shape of a washer, while the slug 130 in FIGURE 11 is thinner than a conventional coin of the same diameter.

In the operation of the instant invention, any coin or slug inserted into the coin carrier will operate to engage the element 40, whereby the element will be pivoted about the pin 44. Furthermore, the pawls 38 and 42 will each follow the element 40 in response to the action of the ends 80 and 81 of the spring 58. Accordingly, the pawl 38 will be moved into engagement with the teeth 48 while the pawl 42 will be moved upwardly from the position shown in FIGURE 7 to the position shown in FIGURE 5.

As the element 40 pivots, the detent 122 will release the slidable element 100 whereby this element is adapted to move in response to the action of the spring 116. If a slug of type 128 or 130 has been inserted into the coin carrier, then the slidable element 100 will move to a position shown in FIGURE 5. In this position, the element 100 locks the pawl 42 in position so that the engaging edge 64 of this pawl will not engage the teeth 66 even after the slug in the carrier moves onto one of the rises formed on the inner face of the front panel 12.

The locking of the pawl 42 is accomplished due to the engagement of the detent 76 on this pawl with the upper edge 132 defined by the opening 110 of the element 100. As shown in FIGURE 7, the detent 76 is normally positioned beneath a recessed portion 134 which is defined in the opening 110, and which comprises a continuation of the edge 132. If a coin of proper shape is inserted in the coin carrier, the detent 76 is adapted to move into the recess 134, since this recess remains in position above the detent as shown in FIGURE 6. In other words, the slidable element 100 will not slide even when released by the detent 122, since one of the protrusions on the slidable element will be in abutting engagement with the side face of the coin. When the coin reaches one of the rises on the inner face of the front panel, it will force the element 40 upwardly to a greater degree, and the pawl 42 is free to follow due to the action of the spring end 81, whereby the engaging edge 64 of the pawl will engage one of the teeth 66.

On the other hand, if a washer or thin slug is inserted in the coin carrier, then the element 100 will slide to the right in response to the action of spring 116, since the element is released by the detent 122. This sliding movement of the element brings the edge 132 of the opening 110 into position above the detent 76. This arrangement locks the pawl 42 against upward movement, even when the element 40 is pivoted further as a slug engages a rise on the front panel. A locking engagement of the edge 132 with respect to the detent 76 is shown in FIGURE 5.

It is appreciated that the mechanism of this invention will not operate to detect slugs which are of the same diameter and thickness as a regular coin, or which do not have holes in a position to receive a protrusion formed on one of the detecting fingers. Nevertheless, studies have shown that a high percentage of slugs used will be detected by the described mechanism. The arrangement of this invention, therefore, has distinct advantages in that a substantial reduction in revenue losses can be achieved by the operation described. Furthermore, the described arrangement does not involve elements which will in any way require significant changes in the conventional mechanisms used in parking meters. The specific embodiment of this invention which has been described, illustrates that the element 100 can be associated with the previously used pawl members and their associated operating elements, with only minor changes being required in the pawl members. This has the distinct advantage of requiring very little additional cost, since the housing for the meter can remain exactly the same, virtually all operating parts are exactly the same, assembly personnel can be easily indoctrinated for purposes of incorporating the detector, and maintenance personnel can also be readily trained for the handling of difficulties in operation.

It will be understood that various changes and modifications can be made in the constructions described which provide the characteristics of this invention without departing from the spirit thereof, particularly as defined in the following claims.

That which is claimed is:

1. In a parking meter device wherein the setting of time is effected through engagement of pawl means with a rotary setting wheel and wherein a coin inserted in the meter assists in locating the pawl means in position for engaging the setting wheel, the improvement comprising a slug detector mechanism associated with a coin slot adapted to receive and hold said coin, said mechanism comprising finger means associated at the side of said coin slot, a protrusion formed at the end of said finger means and extending toward said coin slot, and means normally urging said finger means toward said coin slot whereby said protrusion is adapted to engage the side of a coin inserted into the coin slot to hold said finger means in place, and whereby said protrusion is adapted to extend into said coin slot when a slug is positioned therein, and including means associated with said finger means adapted to engage said pawl means when a slug is inserted in said slot to prevent engagement of said pawl means with said setting wheel.

2. A parking meter in accordance with claim 1 wherein said finger is disposed on a slidable member and including a detent formed on said pawl means, and a recess formed in said slidable member for freely receiving said detent, movement of said protrusion into said coin slot being effected by sliding of said slidable member, said recess then being moved out of alignment with said detent whereby the detent engages an edge of said slidable member to prevent movement of the pawl means into engagement with the setting wheel.

3. A parking meter in accordance with claim 2 including a plurality of coin slots for coins of different denomination and wherein a plurality of fingers each having one of said protrusions, are connected to said slidable member, each of said protrusions being adapted to enter into a respective coin slot when a slug is present in said meter.

4. In a parking meter device wherein coins are adapted to be received and held in a coin carrier, pivotally mounted pawl means are adapted to be engaged by a coin for movement of the pawl means into engagement with a time setting wheel and including a handle for rotating the coin carrier and the associated pawl means whereby the pawl means are adapted to rotate the setting wheel for the setting of time on the meter, the improvement comprising means for detecting the presence of slugs in the coin carrier and for holding the pawl means out of engagement with the time setting wheel when a slug is detected, said detecting mechanism comprising a slidable member positioned in side-by-side relation with respect to the pivotally mounted pawl means, a detent formed on said pawl means and a corresponding recess formed in said slidable member adapted to receive said detent when the pawl means is pivoted into engagement with the time setting wheel, finger means attached to said slidable member and protrusions defined at the ends of said finger means, said protrusions extending toward coin slots in said device, and means normally urging said protrusions toward respective slots, said protrusions being adapted to be urged into abutting engagement with the side wall of a coin held in a coin slot, said recess being maintained in position for receiving said detent when a protrusion is so held, and wherein said protrusions are adapted to move into said slots when a slug is present therein, said recess being moved out of position for receiving said detent when the protrusions move into said slots, and including an abutting edge defined by said slidable member adjacent said recess for engagement with said detent when a slug is detected to restrain said pawl means against pivotal movement.

5. A parking meter in accordance with claim 4 wherein a pivotal element is adapted to be pivoted by direct engagement with a coin, spring means associated with said pivotal element and engaging said pawl means for urging said pawl means toward said setting wheel, means defined by said pivotal element for restraining said slidable member against sliding movement and for releasing said slidable member when a coin or a slug is inserted in the meter, whereby said slidable member is adapted to restrain pivotal movement of the pawl means when a slug is inserted.

6. A parking meter in accordance with claim 5 wherein said slidable member is sandwiched between said pawl means and said pivotal element and including pin means for confining said slidable member to sliding movement toward and away from said coin slots.

7. A slug detector mechanism for a coin activated construction wherein coins are adapted to be received and held in coin slots for initiating a desired operation, said construction including a plurality of adjacent coin slots for receiving coins of different denominations, said mechanism comprising a slidable member and a plurality of finger means integrally formed with said slidable member and extending outwardly therefrom, said finger means moving in unison in response to sliding movement of said slidable member, one of said finger means being positioned at the side of each coin slot, a protrusion formed at the end of each finger means and extending toward the respective coin slot, means adapted to normally urge said finger means toward said coin slots whereby any one of said protrusions is adapted to be held in abutting engagement with the side face of a coin inserted in one of the slots, and whereby any one of said protrusions is adapted to enter into a respective slot when a slug is positioned therein, and including an operating element for said construction positioned adjacent said slidable member, and means associated with said slidable member for holding said operating element out of operating position when said one protrusion enters into a slot having a slug present therein.

References Cited by the Examiner

UNITED STATES PATENTS

| | | | |
|---|---|---|---|
| 1,193,967 | 8/1916 | Antoine et al. | 194—97 |
| 1,313,032 | 8/1919 | Webster | 194—102 |
| 1,699,353 | 1/1929 | Grant | 194—67 |
| 1,924,618 | 8/1933 | Mills | 194—92 |

EVON C. BLUNK, *Primary Examiner.*

SAMUEL F. COLEMAN, *Examiner.*

R. M. WALKER, *Assistant Examiner.*